July 2, 1940.  J. MIHALYI  2,206,106
PHOTOGRAPHIC CAMERA
Original Filed Jan. 11, 1938

Inventor
Joseph Mihalyi

By Newton M. Purvis
Rolla N. Carter
Attorneys

Patented July 2, 1940

2,206,106

UNITED STATES PATENT OFFICE 2,206,106

PHOTOGRAPHIC CAMERA

Joseph Mihalyi, Rochester, N. Y., assignor to Eastman Kodak Company, Rochester, N. Y., a corporation of New Jersey Original application January 11, 1938, Serial No. 184,448. Divided and this application February 3, 1939, Serial No. 254,439

1 Claim. (Cl. 95—44)

This invention relates to photographic cameras of the reflex finder type which provide finder images of substantially the size of the picture to be taken and more particularly to cameras of this type provided with range finders for aiding the user in focusing.

This application is a division of my pending application Serial No. 184,448, filed January 11, 1938.

Heretofore in cameras of this type, the finder has usually been provided with means such as a ground glass for fixing the finder image and focusing was accomplished by observing the sharpness of the fixed image. The image fixing means necessarily reduced the apparent brightness of the image making it difficult to focus on poorly lighted subjects and at best required an experienced user to determine the point of sharpest focus.

It is an object of this invention to provide cameras of this type with range finders coupled to the focusing mechanism so that the camera may be focused with greater precision.

Another object of the invention is the provision of this type of camera with separate focusing means as to eliminate the necessity of an image fixing means thereby permitting a greater amount of light for view finding purposes.

Another object of the invention is the provision of a novel arrangement whereby the range and view finder images are simultaneously visible to the user.

Other objects of the invention relate to the arrangement and organization of parts which provide a compact, sturdy and accurate device.

Still other objects and advantages of the invention will be apparent from the following description when read in connection with the accompanying drawing in which are shown only those parts of complete cameras which are necessary to a full understanding of the invention.

Figure 1:
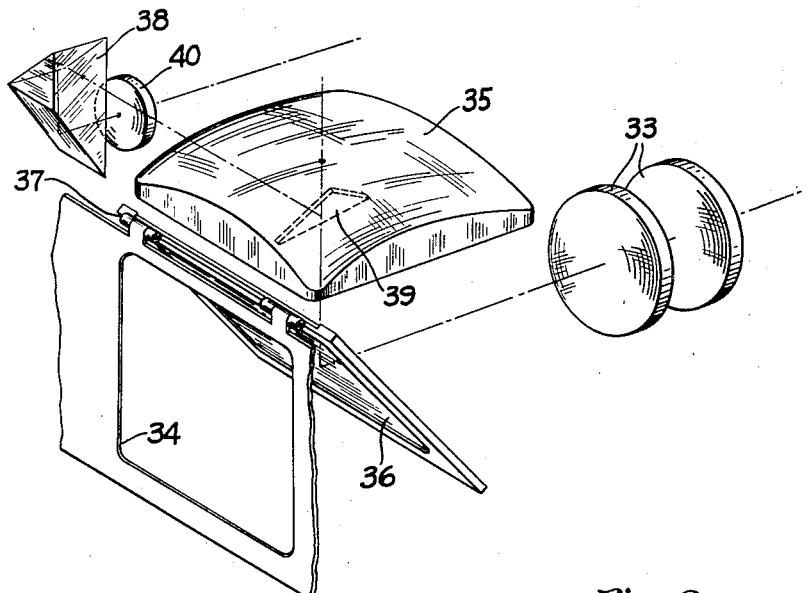
Fig. 1 is a view in perspective of the optical parts of a reflex camera incorporating a preferred embodiment of the invention.

The range finder arrangement of the invention is shown as employed on a reflex type of camera in which, by means of a swinging mirror, the objective lens of the camera is employed for view finding purposes. Certain parts of such a reflex camera are shown in Fig. 1 as comprising an objective 33, an exposure window 34, a finder field lens 35, and a mirror 36 hinged at 37 so that it may be swung from the view finding position shown out of the path of the image forming rays coming from the objective 33 for making a photographic exposure.

In this embodiment a beam of light spaced from the optic axis of the objective 33 is directed through a finder field lens 35 in any suitable manner as by a porro prism 38 and a reflecting member 39 positioned under the field lens 35. In this light beam is positioned a lens 40 for forming in the field lens 35 an image of that portion of the field of view which is blotted out by the reflecting member 39 to provide the complete image in the view finder which may be mutilated when the camera is in other than the correct focus.

Figures 2, 3:
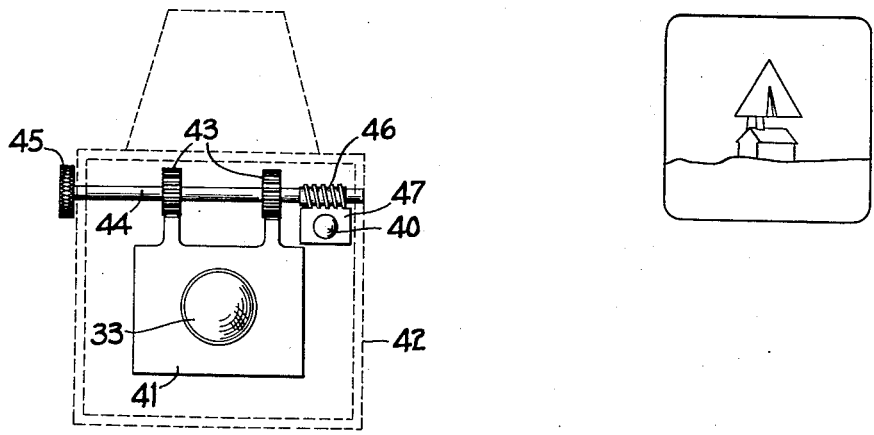
Fig. 2 is a front elevation partly in outline of the camera of Fig. 1 showing an arrangement for coupling the camera focusing movement to the range finder.
Fig. 3 shows the field of view as it appears to the user of the camera shown in Figs. 1 and 2.

In the present arrangement, as shown in Fig. 2, the camera objective 33 is carried in a lens board 41 which is adapted to be moved toward and away from the exposure window 34 provided in a camera casing 42 by means of two toothed wheels 43 carried on a shaft 44 which is adapted to be turned by a knob 45 for focusing the camera in a well known manner. This shaft 44 is also provided with a worm 46 which meshes with teeth carried by a frame 47 in which the range finder lens 40 is mounted.

With this arrangement the observer will see two images as shown in Fig. 3 and when these two images form a mutilated image as shown, he will know that the camera is not correctly focused. The focus is then altered by turning the knob 45 until the observed images combine to form a non-mutilated image at which time he will know the camera objective 33 is properly focused for making an exposure.

It will be evident to those skilled in the art that the present invention provides a simple, compact and accurate arrangement whereby a large brilliant finder may be employed on reflex cameras and also an arrangement for insuring more exact focus even if it is desirable to employ an image receiving surface in connection with the finder as is now customary.

While I have described in detail one specific embodiment of my invention, it is to be understood that its scope, as pointed out in the appended claim, is intended to cover all those modifications which an understanding of the above disclosure will make obvious to those skilled in the art.

What I claim is:

In a reflex photographic camera, a casing, an objective in the front of the casing, a mirror pivotally mounted in the casing and adapted to be moved into and out of the path of light transmitted by the objective, whereby the image formed by the objective may be made selectively to occupy either of two planes, means laterally spaced from the objective for accepting a beam of light coming from the scene to be photographed and for directing it perpendicularly to one of said planes, said means including a lens having the same focal length and spaced optically the same distance from said one of said planes as said objective, and means for making visible to an observer the coplanar images formed by said objective and said lens.

JOSEPH MIHALYI.